United States Patent
Ingram

[19]

[11] Patent Number: 6,123,880
[45] Date of Patent: Sep. 26, 2000

[54] METHOD FOR COMPRESSION MOLDING PLASTIC ARTICLES

[75] Inventor: Keith W. Ingram, Holland, Ohio

[73] Assignee: Owens-Illinois Closure Inc., Toledo, Ohio

[21] Appl. No.: 09/143,595

[22] Filed: Aug. 31, 1998

Related U.S. Application Data

[62] Division of application No. 08/857,666, May 16, 1997, Pat. No. 5,866,177.

[51] Int. Cl.$^7$ ............................ B29C 31/00; B29C 43/06; B29C 43/08; B29C 43/34
[52] U.S. Cl. ...................... 264/39; 264/297.6; 264/297.8; 264/319; 425/168; 425/297; 425/348 R; 425/451; 425/451.5; 425/451.6; 425/451.9; 425/809; 425/DIG. 5
[58] Field of Search .............................. 264/297.1, 297.6, 264/297.8, 319, 177.17, 211.12, 39; 425/297, 313, 348 R, 451, 451.5, 454, 457, 595, 809, DIG. 5, 768, 451.645, 451.9

[56] References Cited

U.S. PATENT DOCUMENTS

| | | |
|---|---|---|
| 2,155,316 | 4/1939 | Lauterbach . |
| 2,198,543 | 4/1940 | Lauterbach . |
| 2,227,265 | 12/1940 | Lauterbach . |
| 2,235,222 | 3/1941 | Lauterbach . |
| 3,008,181 | 11/1961 | Fitz et al. ............................... 264/297.6 |
| 3,853,299 | 12/1974 | Kessel ...................................... 249/178 |
| 4,111,633 | 9/1978 | Gabrys ....................................... 425/451 |
| 4,403,810 | 9/1983 | Bieneck .................................... 425/589 |
| 4,640,673 | 2/1987 | Takeda et al. ........................... 425/297 |
| 4,776,782 | 10/1988 | Murayama et al. .................... 425/149 |
| 5,554,327 | 9/1996 | Ingram et al. .......................... 264/40.5 |
| 5,603,964 | 2/1997 | Rote et al. ............................... 425/110 |
| 5,670,100 | 9/1997 | Ingram .................................... 264/40.5 |

*Primary Examiner*—Jill L. Heitbrink
*Assistant Examiner*—Michael I. Poe

[57] ABSTRACT

A method for compression molding plastic articles such as closures include a plurality of tools mounted in opposed pairs with the tools of each pair including opposed male and female mold sections. The tool pairs are mounted for motion in an endless path. The tool pairs and associated mold sections are closed during motion in the path for compression a molding charge in the mold cavity formed between the mold sections of each pair, and opening the mold cavity to release an article formed between the mold sections. A latch mechanism is associated with each pair of tools for holding the tools and mold sections in the closed position during motion in the path independent of the mechanism for closing the tools and mold halves. In this way, forces imparted to the mold halves and tools to hold the mold closed are isolated from the machine frame. The latch mechanism is selectively unlatched to permit opening of the mold halves and release of the article compression-molded between the mold halves.

3 Claims, 11 Drawing Sheets

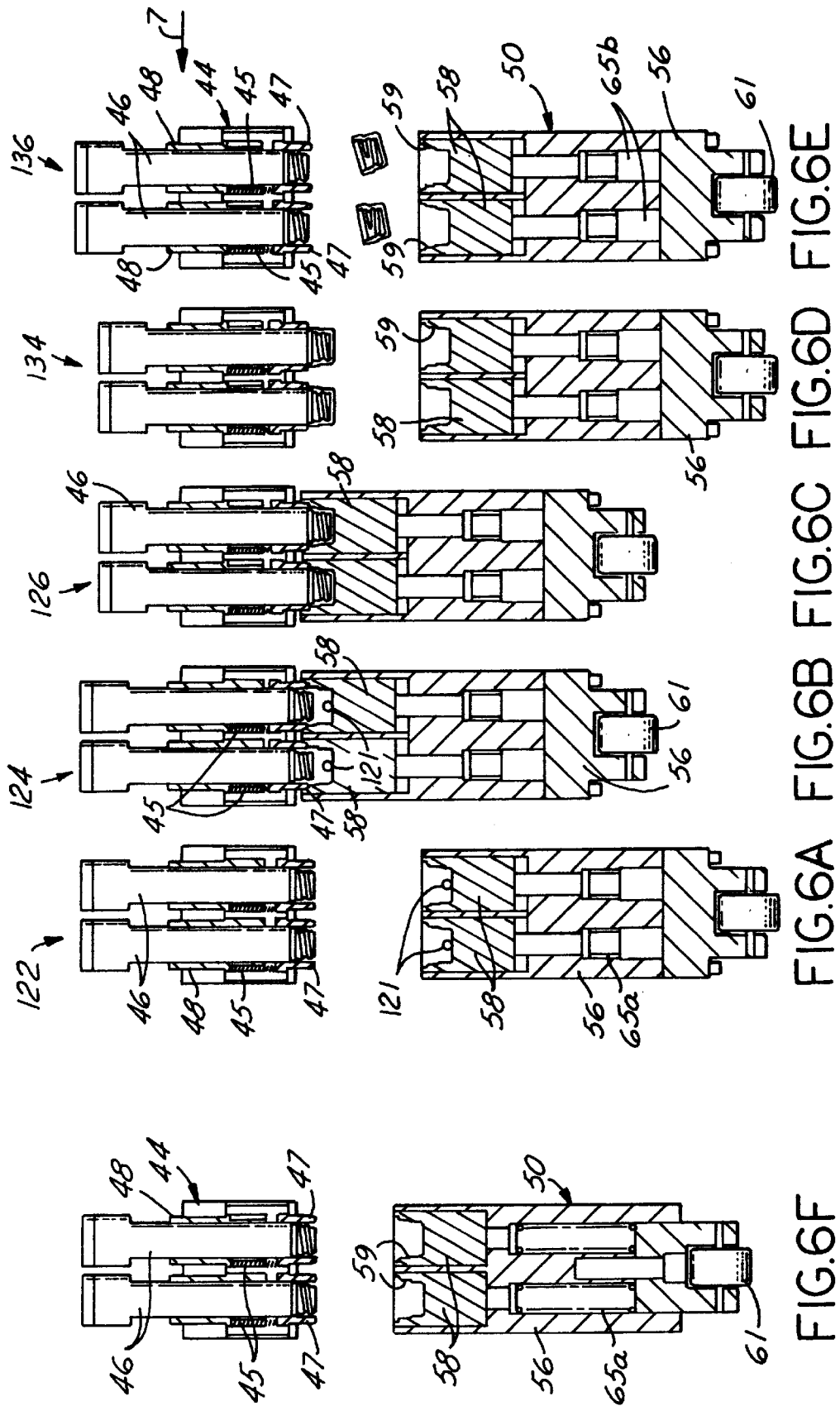

METHOD FOR COMPRESSION MOLDING PLASTIC ARTICLES

The application is a division of application Ser. No. 08/857,666 filed May 16, 1997, now U.S. Pat. No. 5,866,177.

The present invention is directed to a method and apparatus for compression molding plastic articles such as closures, and more particularly to an improvement in the method and apparatus disclosed in U.S. Pat. No. 5,554,327.

BACKGROUND AND OBJECTS OF THE INVENTION

U.S. Pat. No. 5,554,327, assigned to the assignee hereof, discloses a method and apparatus for compression molding plastic articles such as plastic closures. A plurality of tools are mounted in a circumferential array on a rotatable turret in a plurality of opposed coacting pairs. The tools of each pair carry opposed male and female mold sections that together. when closed, form a cavity mold for compression molding the desired articles. The turret is mounted on a machine frame that also carries cams for operative engagement with the tools for moving the tools of each pair toward each other during a portion of motion of the tools around the turret axis for compression molding articles between the tool pairs, and for moving the tool pairs away from each other during another portion of tooling travel for releasing articles molded between the tools. Fluid Cylinders are associated with each tool pair to provide a constant limiting molding force for each tool pair. U.S. Pat. No. 5,603,964, also assigned to the assignee hereof. discloses an apparatus for cutting and delivering extruded plastic gobs to the successive molds of the molding apparatus.

Although the methods and apparatuses disclosed in the noted patents address and overcome problems theretofore extant in the art, further improvements remain desirable. For example, it is desirable to hold the tools and mold halves in the closed and compressed position for as long as possible to improve cooling efficiency and part definition and quality during the molding process. However, it is also undesirable to employ the cams on the machine frame for holding the molds closed at normal molding force during most of the operating cycle because this would place undesirable forces on the machine frame and increase cam wear. For this reason, it is conventional practice to reduce mold forces during the curing portion of the cycle, with corresponding reduction in cooling efficiency and part quality. It is also desirable to improve machine efficiency by increasing the tooling density within a machine, and thereby increasing overall productivity per unit of plant floor space. However. employing conventional technology, this would only exacerbate the mold force problem, which in turn would require redesign of the machine frame. cams and bearings.

It is therefore a general object of the present invention to provide a method and apparatus for compression molding plastic articles that permit maintenance of full compression force on the mold elements during the forming and curing of the molded component while reducing wear on the cams that close the mold elements, and while reducing mold clamping reaction forces applied to the machine frame. Another object of the present invention is to provide a method and apparatus of the described character that achieve improved efficiency in terms of tooling density and utilization of plant floor space.

SUMMARY OF THE INVENTION

A method and apparatus for compression molding plastic articles such as closures in accordance with the present invention include a plurality of tools mounted in opposed pairs with the tools of each pair including opposed male and female mold sections. The tool pairs are mounted for motion in an endless path. The tool pairs and associated mold sections are closed during motion in the path for compression molding a charge in the mold cavity formed between the mold sections of each pair, and opening the mold cavity to release an article formed between the mold sections. In accordance with one aspect of the present invention, a mechanism is associated with each pair of tools for locking the tools and mold sections in the closed position during motion in the path independent of the mechanism for closing the tools and mold halves. In this way, forces imparted to the mold halves and tools to hold the molds closed are isolated from the machine frame. The locking mechanism is selectively unlocked to permit opening of the mold halves and release of the articles compression-molded between the mold halves.

The opposed tool pairs are mounted in the preferred embodiment of the invention on a slide mechanism that interconnects the tools of each pair. The locking mechanism is disposed to engage the slide mechanism to prevent motion of the tools of each pair away from each other. The slide mechanism in the preferred embodiment of the invention includes a slide shaft coupled to one of the tools of each pair, with the other tool of each pair being slidable on the shaft. The locking mechanism includes a stop on the shaft and a latch disposed on the other tool of each pair for movement between a first position in engagement with the associated stop for holding the tools and associated mold sections in closed position, and a second position in non-engagement with the stop for permitting opening of the tools and associated mold sections. The latch in the preferred embodiment of the invention is urged to the first or latching position by a spring disposed between the latch and the tool on which the latch is mounted, and is moved to the second or non-latching position by means of a latch actuator that extends from each latch for engagement with a cam disposed in fixed position on the machine frame adjacent to the path of tool travel. The latch and stop are so contoured with respect to each other that an increase in molding force within a compression mold cavity increases the force of abutting engagement between the latch and the stop.

In accordance with another aspect of the present invention. each of the tool assemblies carries mold cavity cores and holders for forming a plurality of mold cavities at each tool pair. The mold cavities are equally spaced from each other circumferentially of the mold path, both within each tool set and between tool sets. Density of production is thus greatly increased as compared with prior art in which each tool pair forms only a single cavity. The mold elements and cavities preferably are disposed in arrays on each tool pair concentric with the turret axis. Preferably, each tooling within each array is equally circumferentially spaced from its adjacent tooling within the same array. The mold cavities may be radially aligned or radially staggered with the same number of cavities in each array, or may be disposed such that there is a greater number of cavities in the outer array than in the inner array.

BRIEF DESCRIPTION OF THE INVENTION

The invention, together with additional objects, features and advantages thereof, will be best understood from the following description, the appended claims and the accompanying drawings in which:

Figure 1:
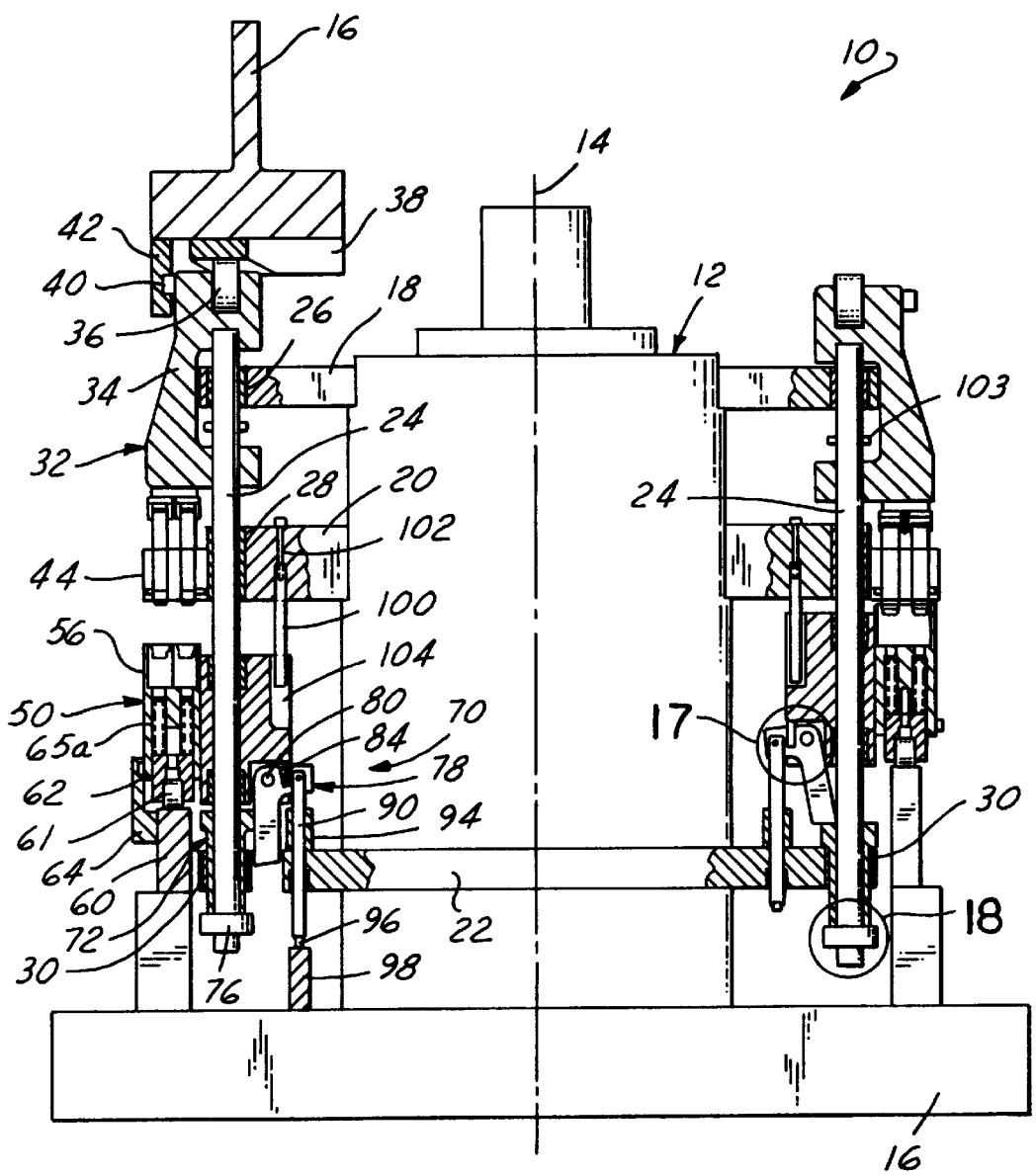
FIG. 1 is a sectional view in side elevation of a compression molding apparatus in accordance with one presently preferred embodiment of the invention.
Figure 2A:
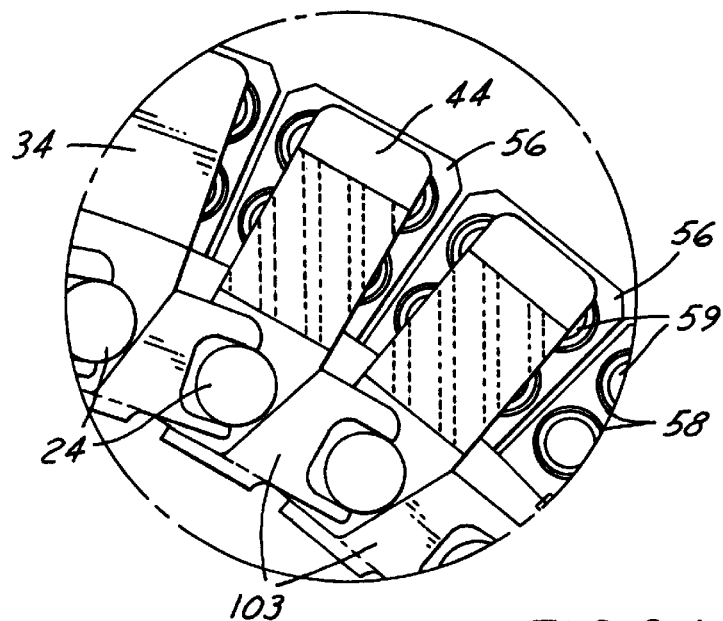
FIG. 2A is a fragmentary view on an enlarged scale of a portion of FIG. 2.
Figure 2:
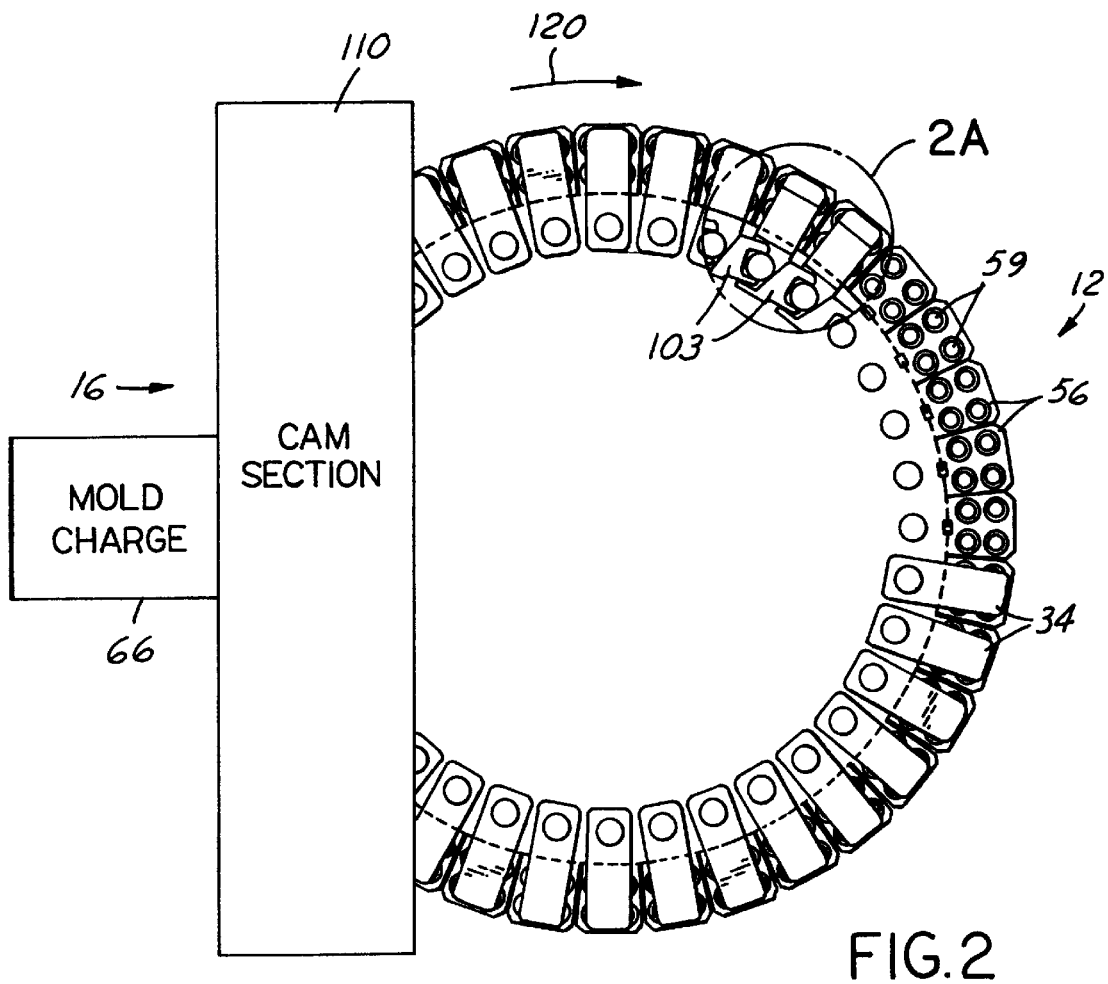
FIG. 2 is a top plan view of the molding apparatus illustrated in FIG. 1.
Figure 3:
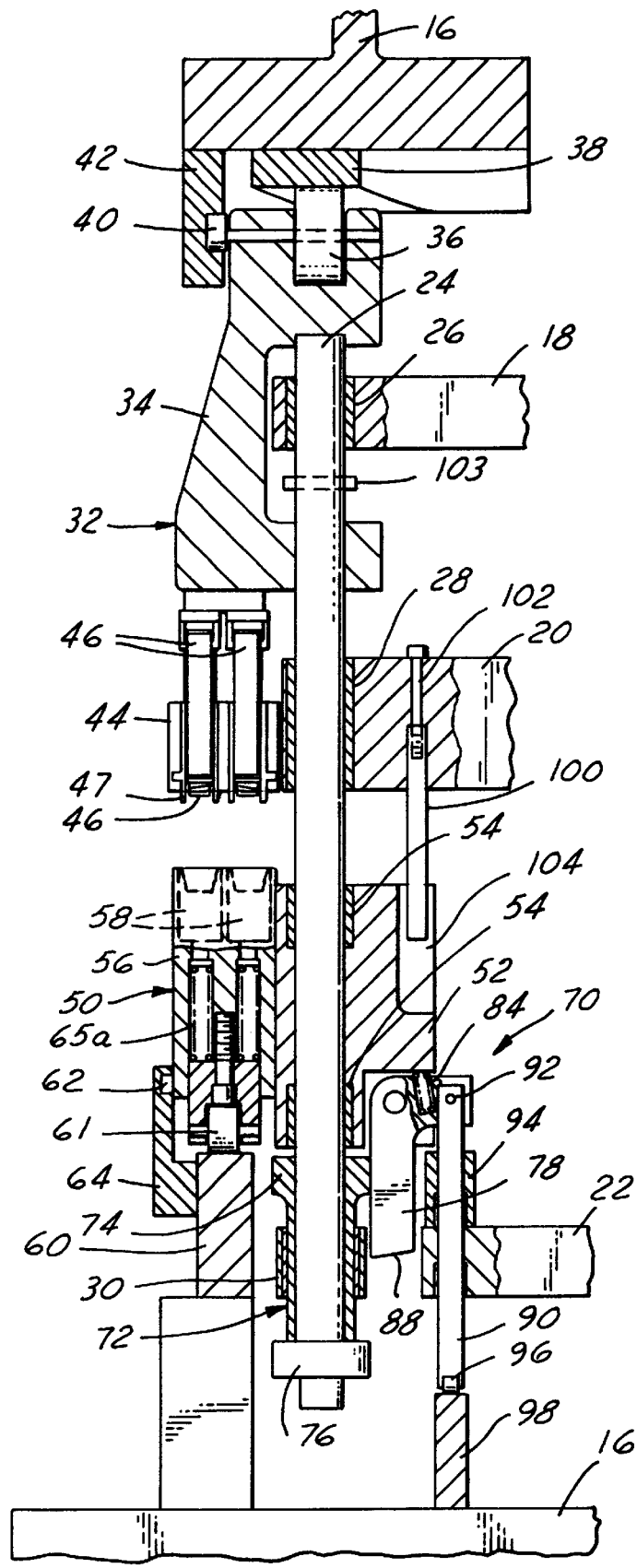
FIG. 3 is a fragmentary elevational view of a portion of the machine illustrated in FIG. 1 on an enlarged scale.
Figure 4:
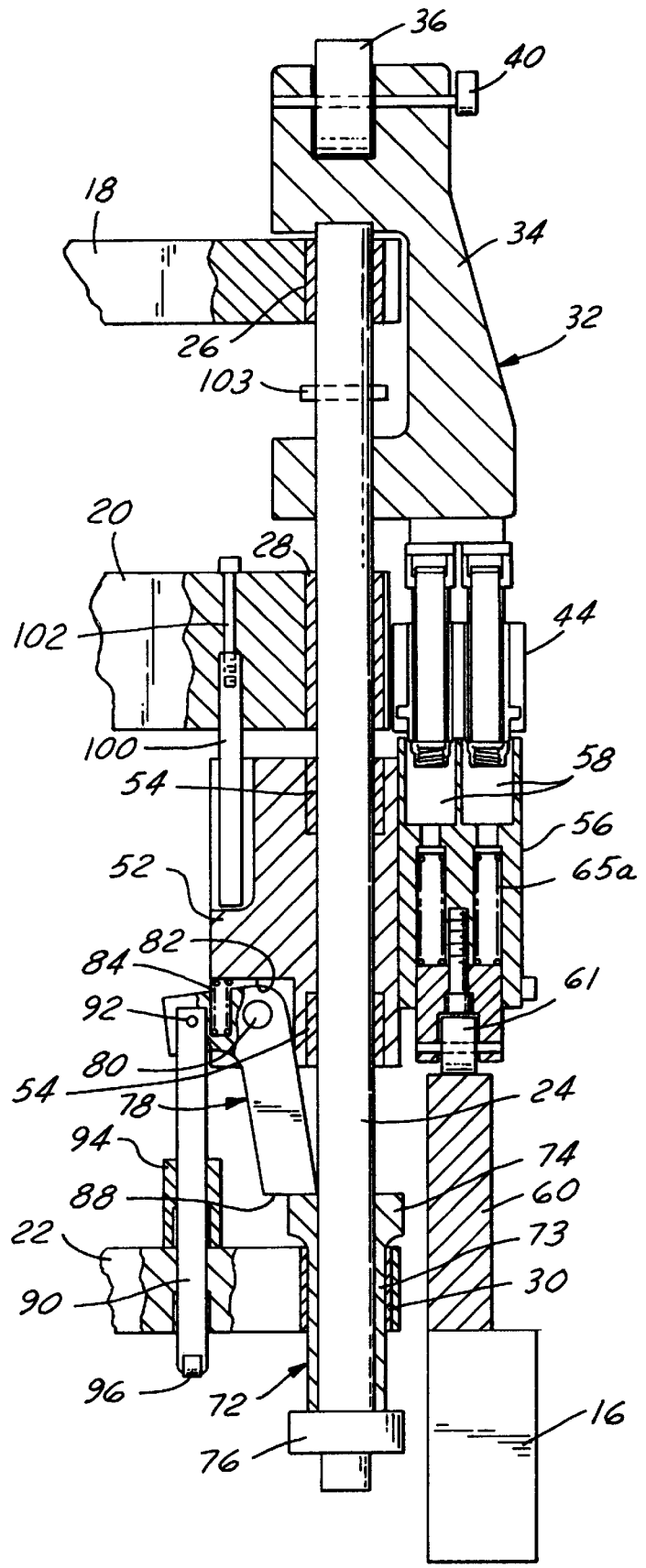
FIG. 4 is a fragmentary elevational view of another portion of the machine illustrated in FIG. 1 on an enlarged scale.
Figure 5:
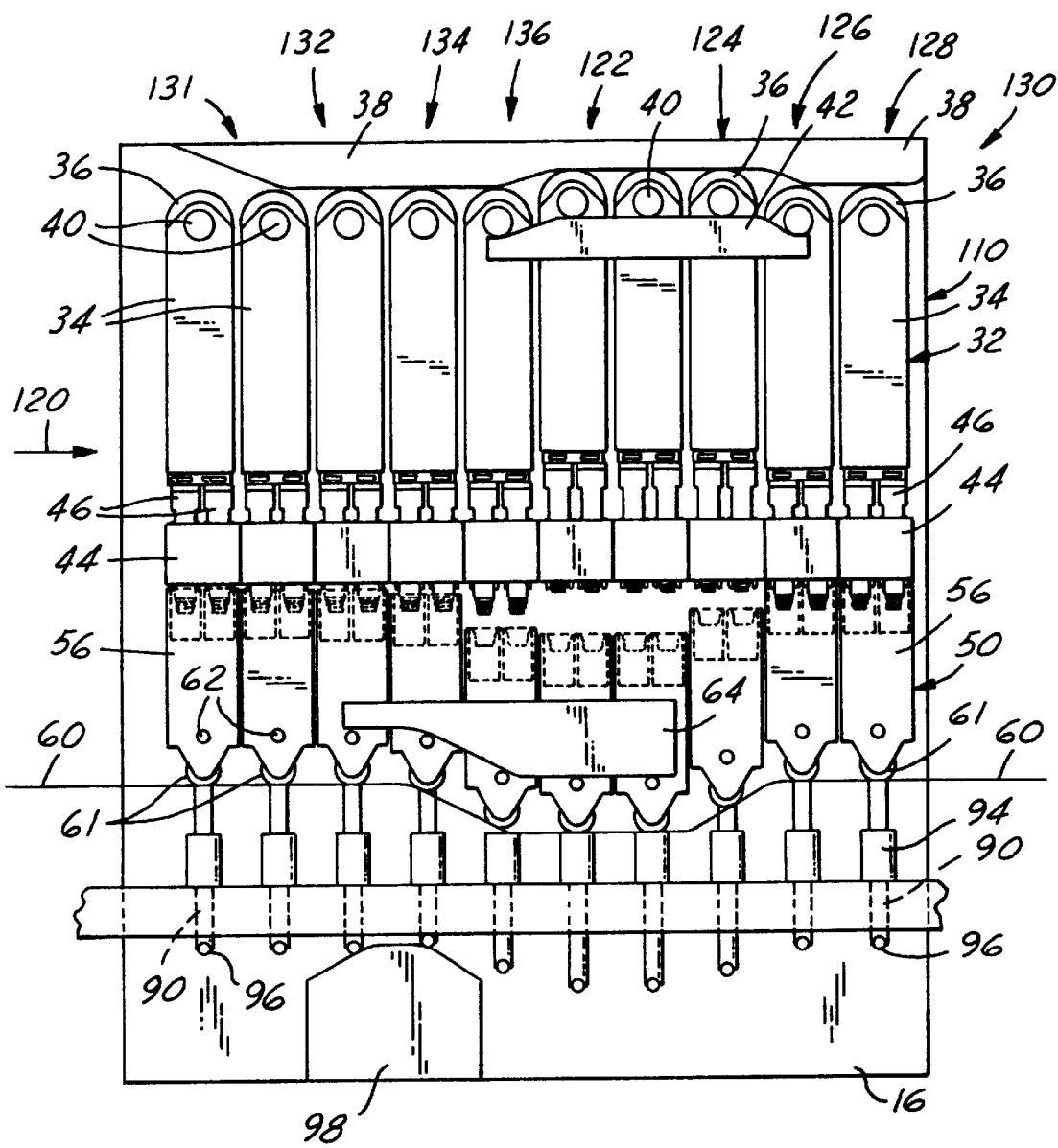
FIG. 5 is a fragmentary elevational view showing timing of the various cams in the apparatus cam section.
Figure 10:
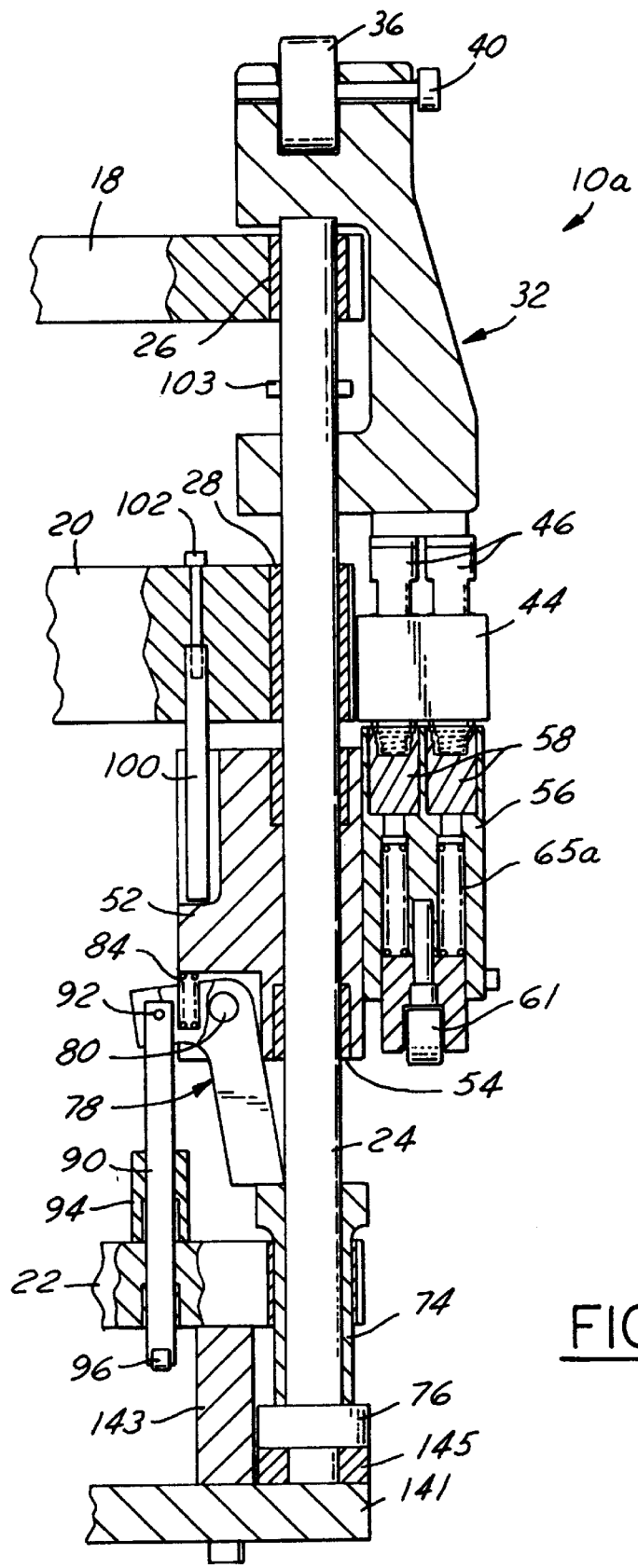
Figure 7:
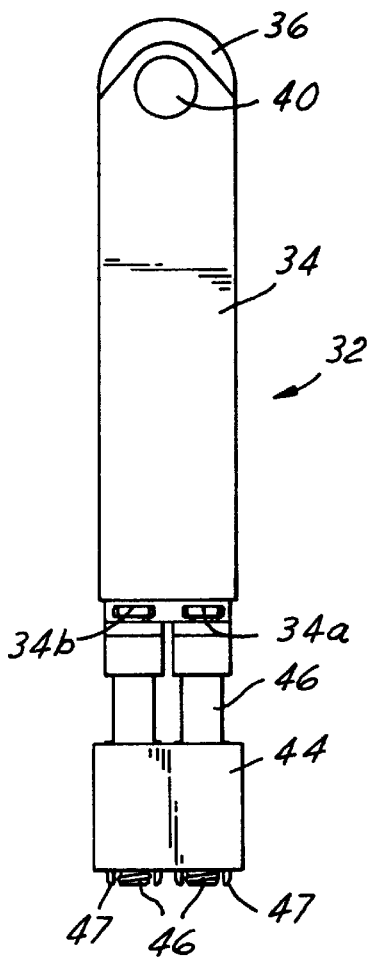
Figure 8:
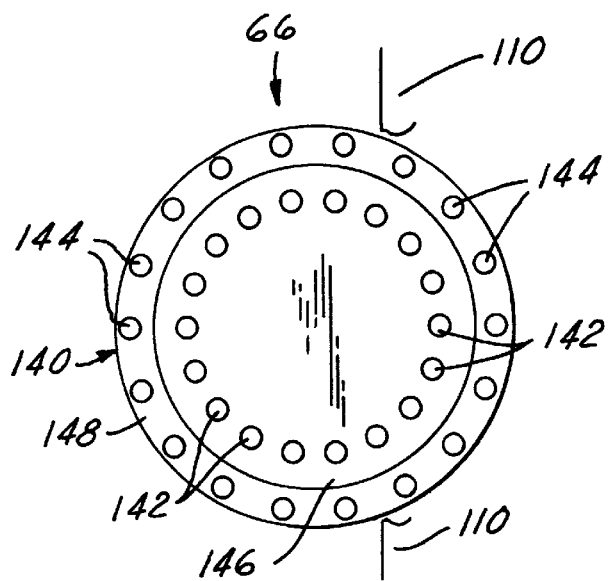
Figure 9:
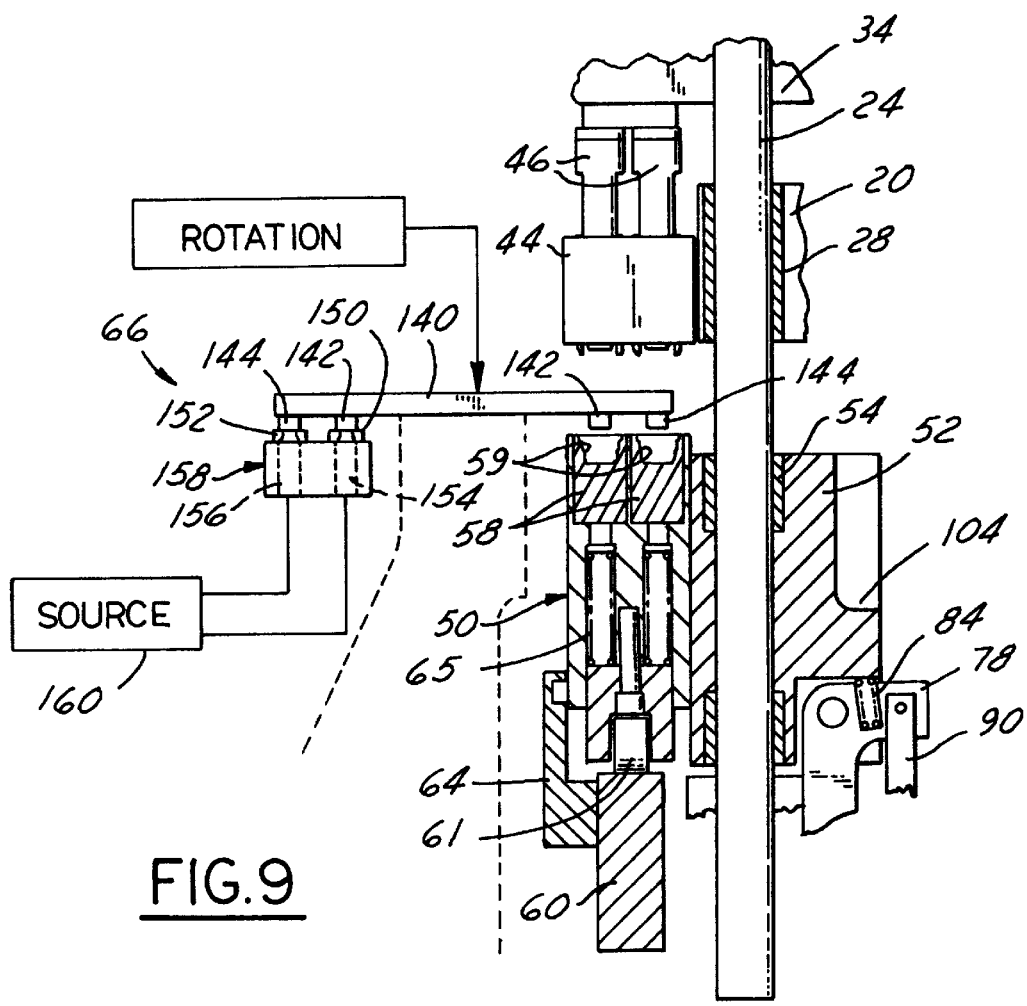
Figure 11:
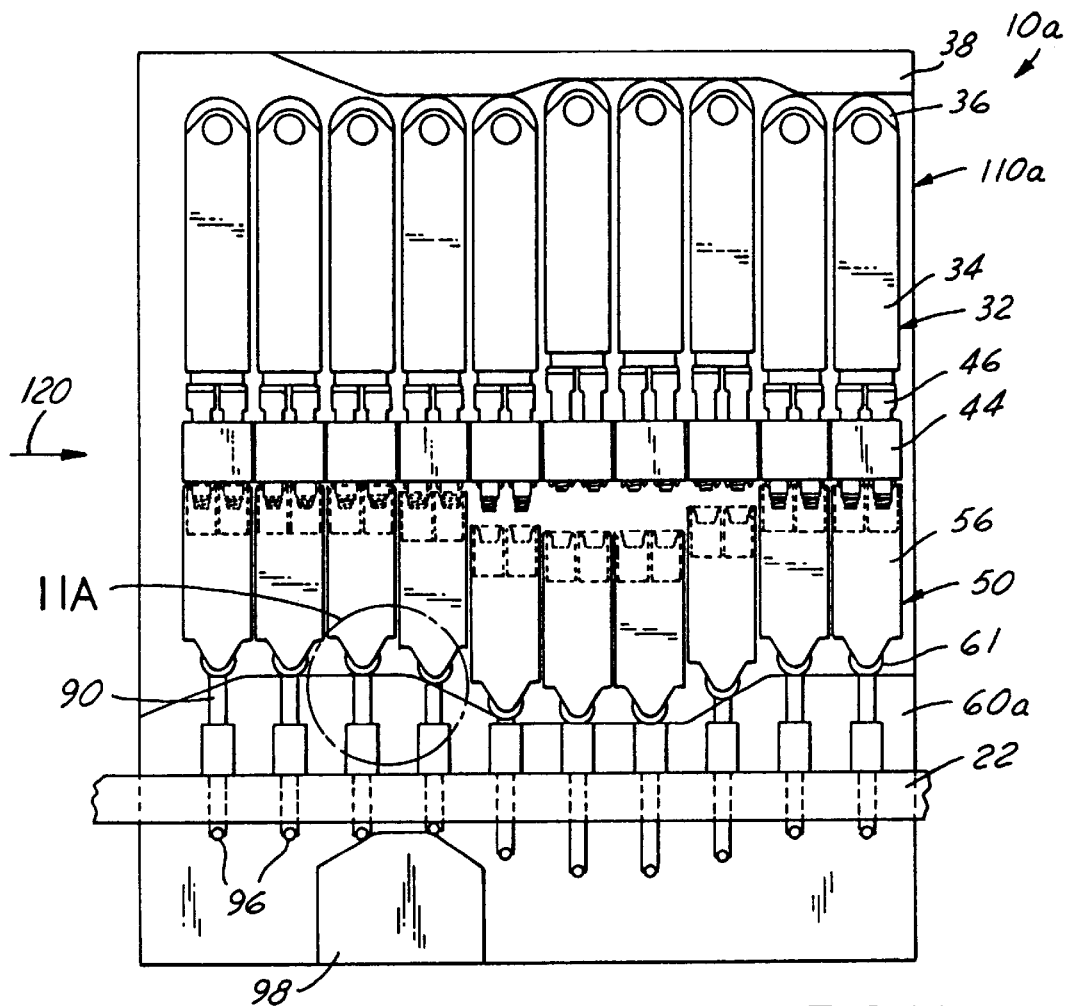
Figure 11A:
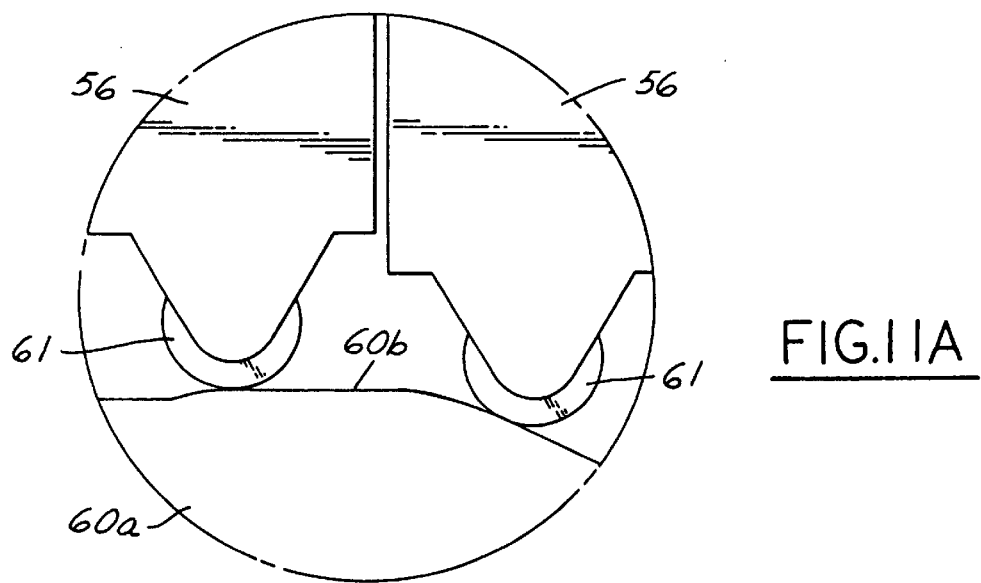
Figure 12:
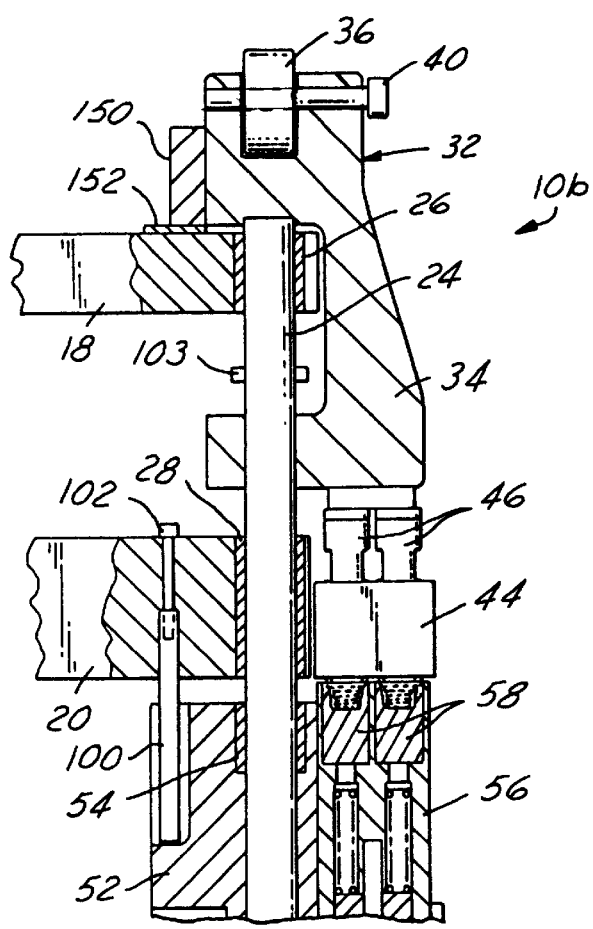
Figure 13:
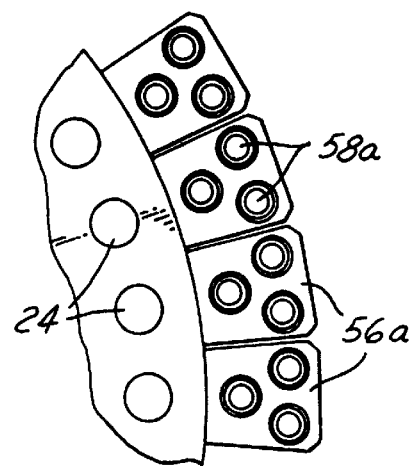
Figure 14:
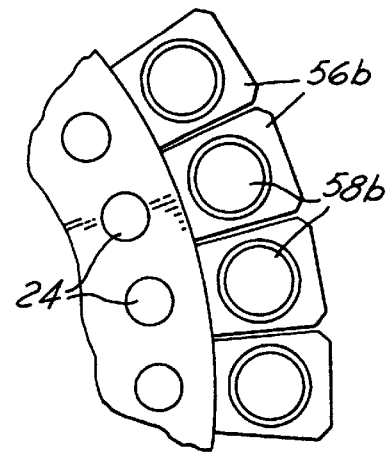
Figure 15:
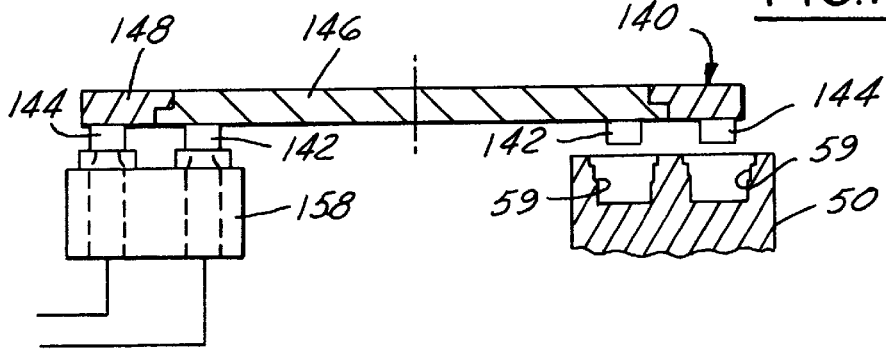
Figure 16:
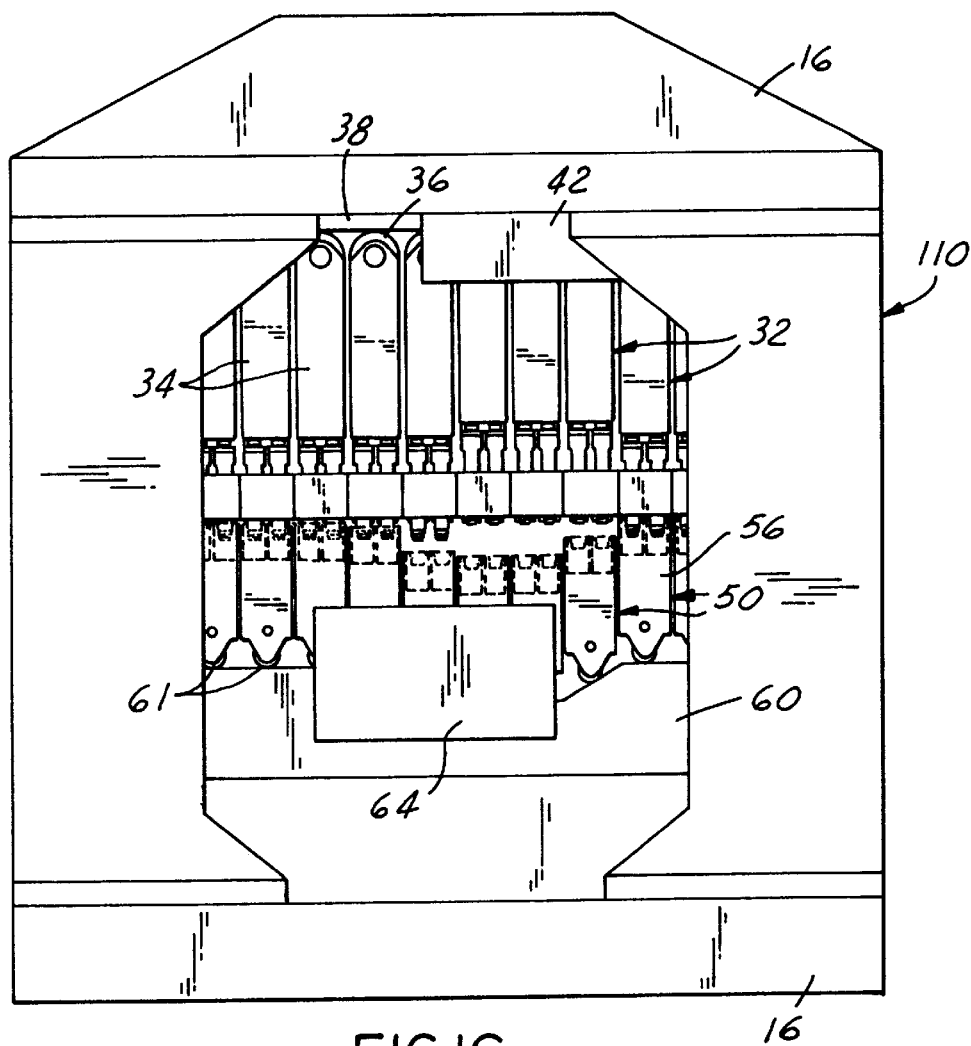
Figure 17:
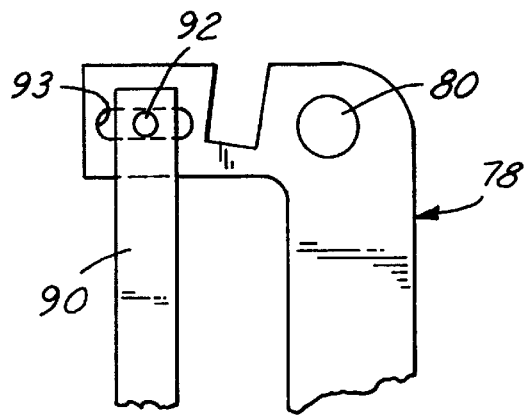
Figure 18:
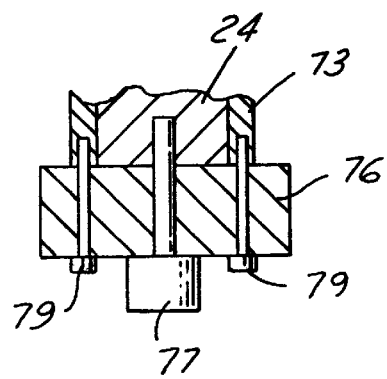

FIGS. 6A–E are fragmentary elevational views that illustrate the upper and lower tooling assemblies at sequential stages of operation;

FIG. 6F is a view similar to that of FIG. 6D a showing a modified embodiment of the invention;

FIG. 7 is an elevational view taken from the direction 7 in FIG. 6E;

FIG. 8 is a fragmentary plan view of the mold charge station in FIG. 2;

FIG. 9 is an elevational view of the mold charge station in FIG. 8 in conjunction with the apparatus tooling of FIG. 3;

FIG. 10 is a fragmentary elevational view similar to that of FIG. 4 but showing a modified embodiment of the invention;

FIG. 11 is a fragmentary elevational view similar to that of FIG. 5 but showing modification thereof in accordance with the embodiment of FIG. 10;

FIG. 11A is a fragmentary view on an enlarged scale of a portion of FIG. 11;

FIG. 12 is a fragmentary elevational view similar to those of FIGS. 4 and 10 but showing another modified embodiment of the invention, FIGS. 13 and 14 are fragmentary views on an enlarged scale that illustrate respective modifications to the embodiment of FIG. 2;

FIG. 15 is an elevational view of a portion of FIG. 9 showing the gob feeder disk in greater detail;

FIG. 16 is an elevational view taken substantially from the direction 16 in FIG. 2; and FIGS. 17 and 18 are fragmentary views on enlarged scales of the portions of the apparatus within the circles 17 and 18 in FIG. 1.

DETAILED DESCRIPTION OF PREFERRED EMBODIMENTS

The disclosures of above-noted U.S. Pat. Nos. 5,554,327 and 5,603,964 are incorporated herein by reference.

FIGS. 1–9 illustrate a compression molding apparatus 10 in accordance with a presently preferred embodiment of the invention as comprising a turret 12 mounted for rotation about an axis 14 on and with respect to a machine frame 16. Turret 12 has three axially spaced radially extending plates 18, 20, 22 that form mounting brackets for the compression mold tooling, as will be described. A uniformly spaced circumferential array of slide shafts 24 extend parallel to axis 14 of turret 12 through slide bearings 26, 28, 30 carried by turret plates 18, 20, 22 respectively. An upper tooling assembly 32 includes an upper actuator 34 affixed to slide shaft 24 on opposite axial sides of upper turret plate 18. An upper cam follower roller 36 is carried by actuator 34 for rolling engagement with an upper forming cam 38 carried by machine frame 16 above turret 12. Actuator 34 also carries a roller 40 that cooperates with an upper lift cam 42 on frame 16 for lifting actuator 34 and tooling assembly 32 upwardly for release of molded parts. An upper tool holder 44 is carried by each actuator 34 and slidably mounted on center turret plate 20. Each tool holder 44 includes an array of mold cores 46 (four in the illustrated embodiment) slidable in associated core sleeves 48 and having lower ends that form the male portions of the compression mold cavities. A stripper sleeve 47 (FIGS. 3 and 6–7) surrounds the lower end of each core 46. and is biased downwardly with respect thereto by a stripper spring 45 (FIG. 6). Stripper springs 45 are encompassed within sleeves 48.

A lower tooling assembly 50 includes a slide 52 having axially spaced bearings 54 that slidably embrace shaft 24 between turret plates 20, 22 beneath and in opposition to each upper tooling assembly 32. A cavity bracket 56 is mounted on each slide 52. and carries a plurality of cavity holders 58 (four in the illustrated embodiment) that form the female mold sections that oppose cores 46 of the associated upper tool assembly 32 so as to form complete cavities for compression molding of the desired articles. Each cavity bracket 56 carries a lower cam roller 61 that is disposed for engagement with a lower forming cam 60 carried by the lower section of machine frame 16. Each cavity bracket 56 also has a roller 62 that is engaged by a lower cam 64 carried by frame 16 for pulling cavity bracket 56 and slide 52 downwardly, and thereby removing molded parts from within the mold cavities. Each cavity holder 58 is biased upwardly by a spring mechanism. such as a coil spring 65a (FIGS. 1, 3–4 and 6F) or a fluid cylinder 65b (e.g., a nitrogen gas spring, FIGS. 6A–6E). An upper rotary union is mounted to the upper frame and conducts cooling water to the turret and tooling mounted thereon, and is well known in the art of rotary compression molding.

To the extent thus far described, operation of mold apparatus 10 is generally as described in above-referenced U.S. Pat. No. 5,554,327. As turret 12 and tooling assembly pairs 32. 50 move in direction 120 in an endless circular path (FIG. 2) about turret axis 14, mold charges are placed by a charge mechanism 66 (FIGS. 2 and 8–9) onto cavity holders 58 when the cavities are in the open condition illustrated in FIGS. 2 and 9. Continued rotation of the turret brings rollers 36, 61 into engagement with upper and lower forming cams 38, 60, which in turn are contoured so as to move tooling assemblies 32, 50 toward each other and thereby bring cores 46 into compression cavity-forming engagement with cavity holders 58 and the mold charges placed therein. The tooling assemblies are then held in this closed position as the turret continues to rotate so as to compression mold and cure the charges placed in the mold cavities into articles of the desired contour. In the apparatus disclosed in the referenced patent, this is accomplished by continued engagement of rollers 36, 61 with cams 38, 60. As the tools rotate about the turret axis toward the end of the forming cycle, the contours of cams 38, 60 are such as to release mold pressure on the cavities, and tooling assemblies 32, 50 are moved away from each other by means of cams 42 64 and cam rollers 40, 62 carried by the upper and lower tooling assemblies respectively. The molded articles are released and stripped from the mold tooling, and the tool assemblies are spaced from each other preparatory to receiving new mold charges.

In accordance with one aspect of the present invention, continued force is applied to the compression mold elements during the curing cycle by a latch mechanism 70 in conjunction with spring 65a or 65b carried by each tooling pair and a stop collar 72 disposed at the lower end of each slide shaft 24. More specifically, each stop collar 72 comprises a sleeve 73 that is slidably disposed within each sleeve bearing 30 surrounding and affixed to the lower end of each shaft 24. Each sleeve 73 has a radially outwardly projecting shoulder 74 at its upper end with a flat radially oriented face, and a lower end in engagement with a ring or collar 76 that affixes collar 72 to shaft 24. As shown in FIG. 18, collar 76 is secured to the lower end of shaft 24 by a screw 77, and is secured to the lower end of stop collar sleeve 73 by the screws 79. A generally L-shaped latch 78 is mounted on a pivot pin 80 within a pocket 82 at the lower end of each slide 52. A coil spring 84 is captured in compression between a pocket on one leg of latch 78 and an opposing face of pocket 82 on slide 52. The second leg of latch 78 extends downwardly from pin 80 to a face 88 for opposed abutting engagement with the axial face of stop collar 72. It will be noted that the face 88 of latch 78 is angulated with respect to the longitudinal dimension of the associated latch leg so as to be in opposed facing engagement with stop collar 72 at the latched position of the latch illustrated in FIG. 4. A latch actuator rod 90 is coupled at one end to each latch 78 by a pivot pin 92, and extends downwardly through a bearing 94 on turret plate 22. As best seen in FIG. 17, pin 92 extends through a slot 93 in latch 78 to accommodate pivoting of latch 78 about pivot pin 80. The lower end of actuator rod 90 carries a cam roller 96 that is disposed for axial engagement with a cam 98 carried by the lower section of machine frame 16. A pin 100 is affixed to middle turret plate 20 by a screw 102, and extends downwardly from plate 20 into a pocket 104 formed on slide 52 for preventing rotation of slide 52 about shaft 24. An antirotation bracket 103 (FIGS. 1–4) is fastened to each actuator 34. and slidably embraces the shaft 24 of the next-adjacent tooling pair (see FIGS. 2 and 2A) to prevent rotation of each actuator 34 about the axis of its associated shaft 24. Screws 102. pins 100 and brackets 103 thus keep the tooling pairs in alignment. Brackets 103 also maintain tangential alignment of rollers 36 with cam 38.

In operation, when the mold cavities are open in the condition of FIGS. 3 and 6A for receiving mold charges. the lower leg of latch 78 is biased by spring 84 into radial sliding engagement with the outer periphery of shoulder 74 on stop collar 72. As turret 12 continues to rotate past mold charge station 66 (FIG. 2), upper and lower rollers 36, 61 are engaged by upper and lower cams 38, 60 as previously described so as to close the mold sections. As lower tooling assembly 50 and latch 78 are moved upwardly by cam 60, and as upper tooling assembly 32 and slide shaft 24 are moved downwardly by cam 38, latch 78 slides along the opposing radial surface of stop collar 72 until the end of latch 78 clears shoulder 74 of stop collar 72. At this point. latch 78 is urged by spring 84 to the latched position illustrated in FIG. 3. The forces applied by upper cam 38 may now be removed, and the opposed mold sections are clamped in compression molding engagement by operation of latch 78 against stop collar 72. This clamped condition is thereafter maintained during a major portion of rotation of the turret and tool sections (FIG. 2) until the tool assemblies again enter cam section 110 within which all cams 38, 42, 64, 98 are disposed. Upper cam 38 then again applies compressive forces so as to release latch 78 for movement. At this point, cam roller 96 is brought into engagement with latch release cam 98 (FIGS. 1, 3 and 5), which moves actuator rod 90 upwardly and pivots latch 78 out of engagement with stop collar 72. With the latch thus held by cam 98 and actuator rod 90 out of the latching position, the camming forces on upper roller 36 and lower roller 61 may be released, and rollers 40, 62 are brought into engagement with cams 42, 64 for separating the mold halves. Thus, the particular tool pair is ready for a next charge and mold cycle.

FIG. 5 illustrates timing of cams 38, 42, 60, 64 an 98 within cam section 110. With the mold tooling passing through the cam section in the direction 120, mold charges 121 (FIG. 6A) are loaded into the mold cavities during the path portion 122 (FIGS. 5 and 6A) in which the mold tooling assemblies are held apart by cams 42, 64 in cooperation with rollers 40, 62. After the mold cavities are charged, continued rotation of the turret in direction 120 causes lower tooling assembly 50 to be lifted by lower forming cam 60 in path portion 124 (FIGS. 5 and 6B). As the lower tooling assembly continues to move upward, latch 78 is in sliding contact with the side of stop collar 72 for the full upward stroke of the lower tooling. Cavity holders 58 contact stripper sleeves 47 and force the stripper sleeves upward against stripper sleeve springs 45 to close the mold cavities. Upper tooling assembly 32 is then lowered in path portion 126 (FIGS. 5 and 6C), by operation of cam 38 and roller 36, by a fixed stroke determined by cam 38. Toward the end of this stroke, the mold limiting force is reached and cavity holders 56 are compressed against the force limiting mechanism provided by either nitrogen gas cylinders 65b or coil springs 65a. At this time, the force of molding results in a reaction force against the cavity and its cavity holder 56 through the nitrogen cylinder or spring, and is opposed by lower forming cam 60. Further actuation of the upper actuator to its final extended position at path portion 128 (FIG. 5) causes cavity holder 56 to move further downward relative to lower actuator slide 52, further compressing the fluid or coil spring, which limits the mold force. At this relative position of upper actuator shaft 24 and slide latch 78, latch 78 clears stop collar 72. and latch spring 84 causes the latch to move into place above the stop collar. As the tooling progresses from upper forming cam 38 at path portion 130 (FIG. 5), the upper tooling assembly is raised by the upward force of the nitrogen or coil spring until latch 78 contacts the upper surface of stop collar 72, which prevents any further separation of the upper and lower tooling assemblies. At this point, the whole lower tooling assembly 32 and 50 is held in a downward position against the reaction force of stripper springs 45, and opposed by lower cam 60 against roller 61.

The tooling assemblies are thus held in a compressed state for the remaining rotation of the turret (FIG. 2) during curing by operation of the latching device, with minimal force being applied to the lower cam and the upper cam being entirely absent. The tooling assembly is thus self-locking. and the opposing forces of the upper and lower tooling assemblies are contained within the tooling assembly, resulting in only the stripper spring force exerting external force against the machine frame. This force is approximately 30% of the total mold force, and is applied in a downward direction against the lower cam and resisted by the turret assembly. As turret rotation continues along path portion 131 into cam section 110 following the cure cycle, upper rollers 36 are sequentially brought into engagement with a releasing section of upper cam 38, which slightly compresses the nitrogen or coil mold force limiting springs so as to relieve the force applied to latch 78. While the latching force is so relieved, roller 96 on latch actuator rod 90 is brought into engagement with cam 98, which releases the latch mechanism and holds the latch mechanism open when lower cam 64 is brought into engagement with rollers 62 at time 132 for lowering the lower tooling assembly. The lower tooling assembly is thus lowered at path portion 134 (FIGS. 5 and 6D), at which point cam 98 can release latch actuator rod 90.

The upper tooling assembly may then be released at time 136, and moved upwardly by cam 42 and roller 40 for stripping formed parts from cores 46 between the tooling assemblies (FIG. 6E) preparatory to loading new mold charges.

FIGS. 8, 9 and 15 schematically illustrate mold charge station 66. A mold pellet wheel assembly 140 has an inner angularly spaced circumferential array of charge pellet transfer cups or nests 142 and an outer angularly spaced circumferential array of charge pellet transfer cups or nests 144. The arrays of nests 142. 144 are disposed on respective radially adjacent annular wheel sections 146, 148. Section 148 is circumferentially slidably carried by section 146. Sections 146, 148 are fastened to each other by screws extending through slotted holes (not shown). FIG. 9 is a schematic representation of wheel 140 having two nests 142, 144 in alignment with a pair of mold charge nozzles 150, 152 on a nozzle block 158, and a diametrically opposed pair of nests 142, 144 overlying the mold cavities 59 into which the mold charges are being positioned. Nozzles 150, 152 are connected to dedicated charge melt channels 154, 156 within nozzle block 158. These channels are independently supplied with extrudate from a source 160 at a rate proportional to the angular velocity of turret 12. For radially aligned mold cavities as illustrated in FIG. 2, the two cavities may be loaded simultaneously. The trailing radially aligned cavities in four-cavity tooling of the type illustrated will receive their mold materials at an increment in time later than the leading cavities within the four-cavity cluster. This time difference is not significant within the overall cycle time. Two pellet cups or nests 142, 144 simultaneously align with two cavities 59 within lower tooling assembly 50. As pellet wheel 140 continues to rotate, an adjacent pair of pellet cups move into alignment with the remaining two cavities within the cluster, and pellets are discharged into the cavities. Since the instantaneous speed of pellet cup 144 is greater than that of pellet cup 142, the trajectory of the respective pellets from each will have a different path toward the underlying cavity. Furthermore, the cavity coincident with pellet cup 144 will be moving at an instantaneous speed somewhat less than the cavity associated with cup 142.

For this reason, outer ring 148 can be mechanically circumferentially adjusted with respect to inner ring 146 to compensate for such speed differences.

In accordance with one aspect of the present invention, the mold cavities are provided in arrays that travel in an endless path, preferably a circular path, in equally circumferentially spaced arrays. Thus, in FIG. 2, there is an inner circular array of mold cavities 59 and an outer circular array of mold cavities 59, with two cavities of each array being disposed in each tooling pair. That is, each tooling pair holds two cavities of the inner array and two cavities of the outer array, or a total of four cavities. It will be noted in particular that the cavities 59 of the inner array and the cavities 59 of the outer array are uniformly and equally spaced from each other both within each cavity bracket 56 and between adjacent cavity brackets. Likewise, the charge transfer cups or nests 142 and 144 in transfer wheel 140 (FIGS. 8–9 and 15) are provided in equally spaced circumferential arrays. Thus, angular velocity of wheel 140 is coordinated with angular velocity of turret 12 so that each may rotate continuously and at constant speed during operation. As noted above, outer ring 148 is circumferentially adjustable with respect to inner ring 146 for timing dispensation of mold charges from the inner and outer cups. In the alternative embodiment of FIG. 13, the number of mold transfer cups or nests 142 within inner ring 146 may be reduced by one-half, or source 160 may be timed to deliver extrudate to every other inner nest 142. However, wheel 140 will still rotate at constant angular velocity, and outer ring 148 may be readily adjusted to accommodate the offset disposition of the mold cavities in FIG. 13. The mechanism for delivering the mold charges to the disk transfer nests and from the disk transfer nests to the mold cavities is the same as in above-referenced U.S. Pat. No. 5.603,964.

FIG. 7 illustrates T-slot connection between core pins 46 and actuator 34 of each upper tooling assembly 32. Two T-slots 34a, 34b in each actuator 34 locate all four core pins 46 within each tooling assembly cluster, each slot being of sufficient width to accommodate the linear pitch difference between cores in the inner array and those in the outer array. By this means, the complete tool holder assembly 44 can be quickly removed from the machine for maintenance or repair. It will also be recognized that, although a cluster of four cavities for each tool assembly pair is illustrated in the drawings, the principles of the present invention in their broadest aspects are not necessarily so limited. Each actuator pair could handle one much larger part, or a cluster of three cavities in which the number of cavities in the outer array would be twice that in the inner array. Since the delivery path to each nozzle 50, 52 (FIG. 9) is independently controlled, the gram weight of the pellets received by the cavities in the inner array can differ from those received in the outer array. Consequently, parts of a different size and shape can be manufactured in the inner and outer arrays.

Implementation of the invention as illustrated in FIGS. 1–9 reduces machine loading approximately 90% as compared with the prior art because fewer tools are simultaneously under compression from the forming cams. Although full mold pressure is applied at all tools during the cure cycle, only the forces applied by the stripper sleeve springs are resisted by the lower forming cam. All other forces are contained within the tooling by the latch mechanism, and these are isolated from the machine frame. There is a considerable reduction in forces (on the order of about 70%) applied to the lower forming cam during the cure cycle, and a 100% reduction in forces applied to the upper forming cam. Simply stated, the upper forming cam is needed only during the opening and closing stages of the mold tooling (FIG. 5). As the number of machine cavities increases, this feature of the invention becomes increasingly significant.

FIGS. 10. 11 and 11A illustrate a modified apparatus 10a in accordance with an alternative embodiment of the invention, in which the need to extend the lower lift cam entirely around the apparatus is eliminated. Specifically, an annular tool support ring 141 is rigidly mounted by a series of support pillars 143 affixed beneath ring 22 of turret 12. Support ring 141 carries an array of circumferentially spaced collars 145 that align in assembly with the lower ends of the several tooling shafts 24. The axial lengths of collars 145 are selected so as to receive the ends of shaft 24 and abut the axially lower face of rings 76 that affix stop collars 74 to shafts 24. Support ring 141 and collars 145 thus limit downward motion of these several actuator shafts 24, and resist the reaction force of mold stripper springs 45 (FIG. 6) that push downward on the lower actuator and the latch mechanism, which transfers the force to actuator shaft 24 when the tooling is in the latched mode. The embodiment of FIGS. 10, 11 and 11A increases stresses within the turret, but eliminates the stress load on the turret bearings. Furthermore. the need for extending the lower cam entirely around the path of travel is eliminated, so that lower cam 60a is disposed entirely within cam section 110a, as are the other cams. As shown in FIG. 11A, lower cam 60a embodies a rise 60b that is timed in associated with cam 98 so as to lift lower actuators 56 and relieved forces on the latch mechanisms as the latches are released by cam 98. Clearly, by choosing appropriate profiles on upper cam 38 and lower cam 60, the latch release could be accomplished by the action of the upper cam as previously described, and this alternative description of function is not intended to limit such earlier embodiment.

FIG. 12 illustrates another modified apparatus 10b in accordance with the present invention, in which the need to extend the lower lift cam entirely around the apparatus again is eliminated. A stop plate 150 is mounted on each upper actuator 34 overlying turret plate 18, and a stop pad 152 is disposed on plate 18 beneath each stop plate 150. As upper actuator 34 and upper tooling assembly 32 is moved downward by cam roller 36 to the latched position, stop plate 150 and stop pad 152 cooperate to limit such downward motion. When the latch is actuated, the forces of stripper springs 45 (FIG. 6) are transferred to upper turret plate 18 actuator 34, stop plate 150 and stop pad 152. The need for the lower cam entirely around the path of travel is thus eliminated, although increased loading is placed on securement of upper actuator 34 to shaft 24. In each case of alternative methods of eliminating lower cam 60 in the curing portion of the cycle, an appropriate ramp downward on cam 60 would be required to allow the latched tooling assembly 32, 56 to be lowered onto the respective stops 150, 152 or 144. 140 in a controlled manner.

FIG. 13 illustrates a modification to the preferred embodiment particularly as shown in FIG. 2, whereby each upper and lower tool assembly carries tooling for three rather than four mold cavities. More specifically, the upper and lower tooling assemblies carry mold cavity holders 58a, mold cores 46, core sleeves, etc for three mold cavities. There are thus two concentric array of mold toolings, with the outer arrays having twice as many cavities as the inner array. FIG. 14 shows a modification in which the multiple mold cavities in each tooling assembly is replaced by single cavity tooling 56b, 58b of larger diameter.

The following description relates to alternative means for providing a selectable restraining of opposing movement of the tooling pairs 32 and 50 and is included to illustrate that the above-mentioned locking means can be achieved by alternate means, and as such the application is not limited to the preferred means illustrated in the figures. For example, in a first modified form of the invention, referring to FIG. 3, slide 52 and upper actuator 34 could be connected by a hydraulic cylinder, with the cylinder rod attached to actuator 34 and the cylinder body is attached to slide 52 in a parallel relationship to the turret axis. The cylinder stroke is fixed and the hydraulic pressure controlled such that the tooling closed condition is sufficient to ensure compression of the pellet and forming of the article, and the molding force is limited by the spring means in the lower actuator, whereby the hydraulic forces exerted by the cylinder marginally exceeds the force required to compress the spring means in the lower actuator. A rotary union could be attached for example to the machine base, and mounted coaxially with the turret from a static hydraulic power unit mounted to the machine base. By conducting the pressurized oil to a plurality of mechanically actuated four-way hydraulic valves, each associated with one of each of an equal number of said hydraulic cylinders and mounted to the turret, it is possible remotely to actuate the valves by a static cam on the machine base selectively to actuate the cylinders and power the tooling pairs to a closed position or to an open position. Using this method, upper cam 36 and/or lower cam 60 could be used to ensure that the relative axial position of the pairs of mold assemblies relative to the turret are in a controlled path during the closing and opening of the mold by the actuation of the cylinders, This method would provide locking means to hold the opposing toolings closed independent of external cams, and as such would function as a locking feature as described in the preferred form of the invention, and in addition could provide the actuating force to close the molds.

In another form of the invention, a hydraulic cylinder could be used without the need for an externally mounted hydraulic power supply. In this case, each cylinder as described above preferably would have a through rod such that the annular area of the piston would be equal to that of the opposing side of the cylinder. A two-way mechanically actuated valve, positioned as described in the first modified form of the invention, would be connected to each of the two cylinder ports, such that with the valve in the open condition, as the piston is displaced, the oil contained within the cylinder on one side of the piston can transfer to the opposite side of the piston passing through the open valve. As both sides of the piston are preferably of equal area, the total volume of oil within the cylinder remains constant and no make-up oil is required. Conversely, if the valve is held closed, then oil cannot transfer rom one side of the piston to the opposing side and the piston is effectively locked in position and the opposing toolings cannot move axially relative to each other. By causing the mechanically actuated valve to be actuated to an open condition, the tooling would be controlled by the cams as mentioned in the preferred method such that the toolings can be opened and closed with little resistance. Conversely, when the toolings transfer to the curing portion of the cycle having no cams, the valve is spring biased to its free state, and the valve will be closed causing the toolings to be locked in an axial relationship as at the time of closing the valve. This would substantially replicate the condition as described in the preferred method, effectively locking the opposing toolings in a fixed axial relationship to hold the opposing toolings closed independent of external cams, and as such would function as a locking feature as described in the preferred form of the invention.

In another form of the invention, the movement of actuator 34 attached to shaft 24 relative to slide 56 can be selectively limited by a fluid pressure actuated shaft clamp. This clamp is rigidly attached to the slide and comprises a pair of semi-cylindrical clamp shoes. A hydraulic actuating cylinder compresses the shoes to the shaft and provides a frictional hold to the shaft relative to the slide. Actuating means for the hydraulic cylinder would be according to the above-described first modified form of the invention. In this case the cam actuating the hydraulic valve would provide selective clamping of the said shaft, to provide a locking means to prevent relative movement of actuator 34 to slide 56. Thus it can be understood that this form of the invention provides an alternative means to that of mechanical latching means of the preferred form of the invention.

A further form of the invention utilizes a ball screw and ball nut, along with a mechanical clutch brake. Said clutch brake being spring loaded to the brake condition and mechanically actuated to the free condition. In this case, the ball screw is rigidly attached to an extension of upper actuator bracket 34 by means of a shaft bushing keyed and axially secured to the ball screw. and this bushing is secured to actuator bracket 34 by securing screws. Thus, the ball screw is held in a fixed relationship to actuator 34, and is mounted parallel to the axis of the turret, Slide 52 has a corresponding ball nut bearing mounted coaxially with the ball screw within the slide for rotational relative movement with the slide, but is restrained from axial movement relative to the slide. Further, a mechanical clutch brake is mounted to the ball nut and to the slide such that in its spring maintained condition, the brake is applied to provide rotational restraint to the ball screw with respect to the slide. The clutch brake is actuated by a remote cam in a similar manner to that operating the latch release in the preferred form of the invention, and in this case will operate to oppose the clutch spring and to allow the ball nut to rotate. It can be understood from this description that the ball screw can move axially relative to the slide only during the period that the brake is disengaged, whereby the ball nut is free to rotate as it is driven by the advancing or retracting ball screw. However, during the period when the brake is engaged, the ball nut cannot rotate relative to the slide, and axial movement of the ball screw relative to the slide is inhibited. This form of the invention provides a further alternative to the latching means described in the preferred form of the invention.

What is claimed is:

1. A method of compression molding plastic articles that comprises the steps of:
    (a) providing a plurality of tool means mounted in opposed pairs, with the tool means of each pair both being moveable toward and away from each other, and with the tool means of each pair including opposed male and female mold means,
    (b) moving the tool means pairs in an endless path with respect to a machine frame,
    (c) positioning first cams on the machine frame for closing the tool means of each pair by moving both of said tool means toward each other to a closed position during a first portion of motion of said tool means in said endless path for compression molding mold charges between the pairs, and for opening said tool means by moving both of said tool means away from each other during a second portion of motion of said tool means in said endless path for releasing molded articles,
    (d) locking said tool means of each pair to each other in said closed position by: (d1) mounting a latch mechanism on each said pair of tool means and a latch actuator extending from each said latch mechanism, and (d2) moving said latch mechanism to lock the tool means of each pair to each other when said tool means pair is moved to said closed position so as to isolate from the machine frame forces imparted to said tool means to hold said tool means together during compression molding in said step (c), and
    (e) unlocking said tool means of each pair from each other by: (e1) positioning a second cam on the machine frame separate from the tool means for engagement with the latch actuator of each said tool means pair, and (e2) moving the latch actuator of each pair by engaging said latch actuator with said second cam to release said latch mechanism and permit opening of said tool means pair by said first cam as said tool means pair enters said second portion of motion in said endless path.

2. A method of compression molding plastic articles that comprises the steps of:
    (a) providing a plurality of tool means mounted in opposed pairs, with the tool means of each pair including laterally spaced mold means forming at least two spaced mold cavities,
    (b) continuously moving said tool means in an endless path,
    (c) sequentially opening and closing said tool means during motion in said path to release molded articles and receive mold charges, and to compression mold the mold charges to form the articles, and
    (d) while the tool means are open, delivering mold charges to said mold means by:
    (d1) mounting a disk to rotate about an axis adjacent to said path such that a periphery of said disk rotates between the tool means when the tool means are open,
    (d2) providing at least two concentrically spaced arrays of mold charge transfer means on said disk periphery, with said arrays being radially spaced from each other by a distance corresponding to lateral spacing between said mold means on each said tool means such that said mold charges are delivered to said laterally spaced mold means simultaneously by said concentrically spaced arrays of mold charge transfer means,
    (d3) continuously rotating said disk in synchronization with said tool means in said path, and
    (d4) mechanically adjusting the of said concentrically spaced arrays of transfer means circumferentially with respect to each other for timing delivery of mold charges to said mold means.

3. The method set forth in claim 2 wherein said step (d3) comprises the step of rotating said disk at a fixed ratio to motion of said mold means in said endless path.

\* \* \* \* \*